US010591217B2

(12) United States Patent
Underys (10) Patent No.: US 10,591,217 B2
(45) Date of Patent: Mar. 17, 2020

(54) SYSTEMS AND METHODS FOR CONTROLLING A VACUUM ARC REMELTING FURNACE BASED ON POWER INPUT (71) Applicant: A. Finkl & Sons Co., Chicago, IL (US)

(72) Inventor: Algirdas Underys, Arlington Heights, IL (US)

(73) Assignee: A. FINKL & SONS CO., Chicago, IL (US)

(*) Notice: Subject to any disclaimer, the term of this patent is extended or adjusted under 35 U.S.C. 154(b) by 521 days.

(21) Appl. No.: 15/340,671

(22) Filed: Nov. 1, 2016

(65) Prior Publication Data
US 2018/0120029 A1 May 3, 2018

(51) Int. Cl.
H05B 3/60 (2006.01)
F27D 11/10 (2006.01)
(Continued)

(52) U.S. Cl.
CPC .............. F27D 11/10 (2013.01); F27B 3/085 (2013.01); F27D 7/06 (2013.01); F27D 9/00 (2013.01); F27D 19/00 (2013.01); H05B 7/07 (2013.01); H05B 7/109 (2013.01); H05B 7/156 (2013.01); H05B 7/20 (2013.01);
(Continued)

(58) Field of Classification Search
CPC ... F27D 7/06; F27D 9/00; F27D 11/08; F27D 11/10; F27D 19/00; F27D 2019/0028; F27D 2019/0034; F27D 2019/0037; F27D 2019/0096; F27D 2007/066; F27D 2009/0018; F27D 2009/0067; H05B 7/07; H05B 7/109; H05B 7/144; H05B 7/148;
(Continued)

(56) References Cited

U.S. PATENT DOCUMENTS 2,942,045 A 6/1960 Johnson et al.
3,186,043 A 6/1965 Murtland, Jr. et al.
(Continued)

OTHER PUBLICATIONS

Rodney L. Williamson, et al., "Dynamic Melt Rte Control on a Laboratory Scale Var Furnace Without Load Cell Feedback"; Form 836 (Oct. 1996) Submitted to: http://lib-www.lanl.gov/cgi-bin/getfile?00796837.pdf.
Industrial Heating: "Model-Based Control of the Vacuum Arc Remelting Process", Aug. 10, 2004, http://www.industrialheating.com/articles/print/84596-model-based-control-of-the-vacuum-arc-remelting-process.
(Continued)

Primary Examiner — Hung D Nguyen
(74) Attorney, Agent, or Firm — Miller, Matthias & Hull LLP (57) ABSTRACT A control system for a vacuum arc remelting (VAR) process for a metal includes a direct current (DC) power source, a ram drive, voltage drip short sensor, and a controller, which includes a processor. The drip short sensor may be configured to measure a drip short frequency of the electric arc over a period of time. The controller is configured to determine a real time arc gap length between the electrode tip and the melt pool based on a correlation between the drip short frequency and arc gap length. The controller is further configured to control power input to the electrode by the DC power supply by determining an input power level to input to the electrode based on the real time arc gap length, the input power level configured to generate a desired arc gap length, by the DC power supply, at the input power level.

14 Claims, 4 Drawing Sheets (51) Int. Cl.
*F27B 3/08* (2006.01)
*F27D 19/00* (2006.01)
*F27D 7/06* (2006.01)
*F27D 9/00* (2006.01)
*H05B 7/07* (2006.01)
*H05B 7/109* (2006.01)
*H05B 7/156* (2006.01)
*H05B 7/20* (2006.01)
*F27B 14/04* (2006.01)
*H05B 7/148* (2006.01)

(52) U.S. Cl.
CPC .................. *F27D 2007/066* (2013.01); *F27D 2009/0018* (2013.01); *F27D 2009/0067* (2013.01); *F27D 2019/0034* (2013.01); *F27D 2019/0037* (2013.01)

(58) Field of Classification Search
CPC .......... H05B 7/152; H05B 7/156; H05B 7/20; F27B 3/085; F27B 3/28
USPC ........ 373/42, 44, 45, 47, 49, 50, 52, 54, 70, 373/104, 105, 106, 108, 67, 68, 102
See application file for complete search history.

(56) References Cited

U.S. PATENT DOCUMENTS

| | | |
|---|---|---|
| 3,272,905 A | 9/1966 | Wooding |
| 4,303,797 A | 12/1981 | Roberts |
| 4,578,795 A | 3/1986 | Fisher et al. |
| 4,797,897 A * | 1/1989 | Stenzel .................. H05B 7/152 373/105 |
| 5,708,677 A | 1/1998 | Williamson et al. |
| 5,930,284 A * | 7/1999 | Hysinger ............... H05B 7/148 373/105 |
| 6,115,404 A | 9/2000 | Bertram et al. |
| 6,758,259 B1 * | 7/2004 | Holzgruber .......... B22D 11/008 164/470 |
| 2013/0279535 A1 * | 10/2013 | Oehler .................. H05B 7/148 373/105 |

OTHER PUBLICATIONS

L.A. Bertram, et al., "The Macroscale Simulation of Remelting Processes", JOM, Mar. 1998.
A. Mitchel, University of British Columbia: "Electroslag and Vacuum Arc Remelting Processes".

\* cited by examiner

SYSTEMS AND METHODS FOR CONTROLLING A VACUUM ARC REMELTING FURNACE BASED ON POWER INPUT

TECHNICAL FIELD

The present disclosure generally relates to vacuum arc remelting and, more particularly, to control systems utilized in vacuum arc remelting processes.

BACKGROUND

Vacuum arc remelting (VAR) processes are commonly used in the production of metal ingots as a secondary melting process. By employing VAR processes to metal ingots, the resultant ingot produced in the VAR process may have increased chemical and/or mechanical homogeneity, which is desirable for metals used in demanding industrial applications. Additionally, because the solidification time of metals during VAR processes can be much more rapid, use of VAR processes may allow for a greater control of microstructure characteristics of an ingot metal. Example metals that are commonly remelted via VAR processes may include, but are not limited to including, nickel, titanium, steel, and any alloys derived from such metals or other metals.

VAR processes may utilize a VAR furnace, which uses direct current (DC) electrical power to remelt metals within a vacuum chamber. A VAR furnace may include a melting chamber and a movable ram that is connected to a DC power supply. The metal to be remelted may begin the VAR process as an electrode, which is connected to the movable ram. The remelted metal may be remelted as an ingot in a water-cooled copper crucible, within the melting chamber. To provide an atmosphere which contains negligible oxygen content, which may react with the metal being melted, and to evacuate impurities from the melting chamber, VAR furnaces may include a vacuum source. Further, in some VAR furnaces, a cooling system is included to extract the heat from the melting chamber.

Control of VAR systems may be based on controlling the arc gap between the end of the electrode and a melt pool formed during remelt, atop the ingot and/or crucible. In VAR practice, it has been observed that keeping a relatively constant arc gap may aid in providing consistent remelt results during the VAR process. Accordingly, control of the VAR process may be, at least in part, based on controlling the arc gap. However, it is often impractical or impossible to physically view the arc gap during the process itself and, therefore, the arc gap may be determined or derived based on other data that is more accessible. For example, some control methods determined that length of the arc and the resistance of the arc (e.g., the voltage drop caused by the arc) have a correlation.

Further, during the remelting process, it has been observed that short-duration short circuits (e.g., a small number of milliseconds) occur during remelting. It has additionally been observed that the frequency of the short circuits has a correlation to the arc gap. Such information may be used to control and/or maintain the arc gap. In prior control methods, the power input has been chosen to obtain the desired melting rate while the velocity of the ram has been altered to dynamically control and/or maintain the arc gap.

However, during VAR processes wherein it is desired that the resultant ingot has a large diameter (e.g., greater than 750 millimeters), ram velocity control may be difficult and/or controlling said velocity may provide inaccurate control of the arc gap, due to the increasingly larger amount of metal that needs to be melted for the same change in arc gap, as the diameter of the electrode increases. Therefore, improved control systems for VAR processes, in which arc gap can be controlled independent of the adjustment of the ram velocity, are desired.

SUMMARY

In accordance with one aspect of the disclosure, a control system for a vacuum arc remelting (VAR) process for a metal is disclosed. The VAR process may utilize a VAR furnace, which may include a crucible in which an ingot formed of the metal is formed, a ram operatively associated with an electrode formed of the metal, a vacuum chamber, and a vacuum source associated with the vacuum chamber. The system may include a direct current (DC) power source, a ram drive, a drip short sensor, and a controller, which includes a processor. The DC power source may be operatively associated with the electrode and configured to produce an electric arc between an electrode tip of the electrode and a melt pool of the ingot. The ram drive may be operatively associated with the ram and configured to drive the ram. The drip short sensor may be configured to measure a drip short frequency of the electric arc over a period of time. The controller may be operatively associated with the DC power source, the ram drive, and the drip short sensor and configured to control ram velocity of the ram using a ram control module, the ram control module determining a ram velocity for the VAR process, the ram velocity configured to achieve a desired melt rate for the electrode, and providing instructions to the ram drive to drive the ram based on the ram velocity. The controller may further be configured to determine a real time arc gap length between the electrode tip and the melt pool, using the drip short frequency over the period of time measured by the drip short sensor, using a gap determination module, the gap determination module determining the real time arc gap length based on a correlation between the drip short frequency and arc gap length. The controller may further be configured to control power input to the electrode by the DC power supply using a power control module, the power control module configured to determine an input power level to the electrode based on the real time arc gap length, the input power level being configured to generate a desired arc gap length between the electrode tip and the melt pool upon transmission of power, by the DC power supply, at the input power level.

In accordance with another aspect of the disclosure, a method for controlling a VAR process is disclosed. The VAR process may utilize a VAR furnace, which may include a crucible in which an ingot formed of the metal is formed, a ram operatively associated with an electrode formed of the metal, a vacuum chamber, and a vacuum source associated with the vacuum chamber. The method may include generating an electric arc between an electrode tip of the electrode and a melt pool of the ingot using a direct current (DC) power source operatively associated with the electrode; driving the ram at a ram velocity using a ram drive operatively associated with the ram, the ram velocity configured to achieve a desired melt rate for the electrode; and determining a drip short frequency of the electric arc over a period of time using a drip short sensor. The method may further include determining a real time arc gap length between the electrode tip and the melt pool, using the drip short frequency over the period of time, based on a correlation between the drip short frequency and arc gap length. The method may further include determining an input power level to the electrode based on the real time arc gap length, the input power level being configured to generate a desired arc gap length between the electrode tip and the melt pool upon transmission of power, by the DC power supply, at the input power level and controlling power input to the electrode by the DC power supply based on the input power level.

In accordance with yet another aspect of the disclosure, a VAR furnace for performing a VAR process for a metal is disclosed. The VAR furnace may include a crucible in which an ingot formed of the metal is formed, a ram operatively associated with an electrode formed of the metal, a vacuum chamber, and a vacuum source associated with the vacuum chamber. The VAR furnace may include a direct current (DC) power source, a ram drive, a drip short sensor, and a controller, which includes a processor. The DC power source may be operatively associated with the electrode and configured to produce an electric arc between an electrode tip of the electrode and a melt pool of the ingot. The ram drive may be operatively associated with the ram and configured to drive the ram. The drip short sensor may be configured to measure a drip short frequency of the electric arc over a period of time. The controller may be operatively associated with the DC power source, the ram drive, and the drip short sensor and configured to control ram velocity of the ram by determining a ram velocity for the VAR process, the ram velocity configured to achieve a desired melt rate for the electrode, and providing instructions to the ram drive to drive the ram based on the ram velocity. The controller may further be configured to determine a real time arc gap length between the electrode tip and the melt pool, using the drip short frequency of the electric arc over the period of time measured by the drip short sensor, by determining the real time arc gap length based on a correlation between the drip short frequency and arc gap length. The controller may further be configured to control power input to the electrode by the DC power supply by determining an input power level to the electrode based on the real time arc gap length, the input power level being configured to generate a desired arc gap length between the electrode tip and the melt pool upon transmission of power, by the DC power supply, at the input power level.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
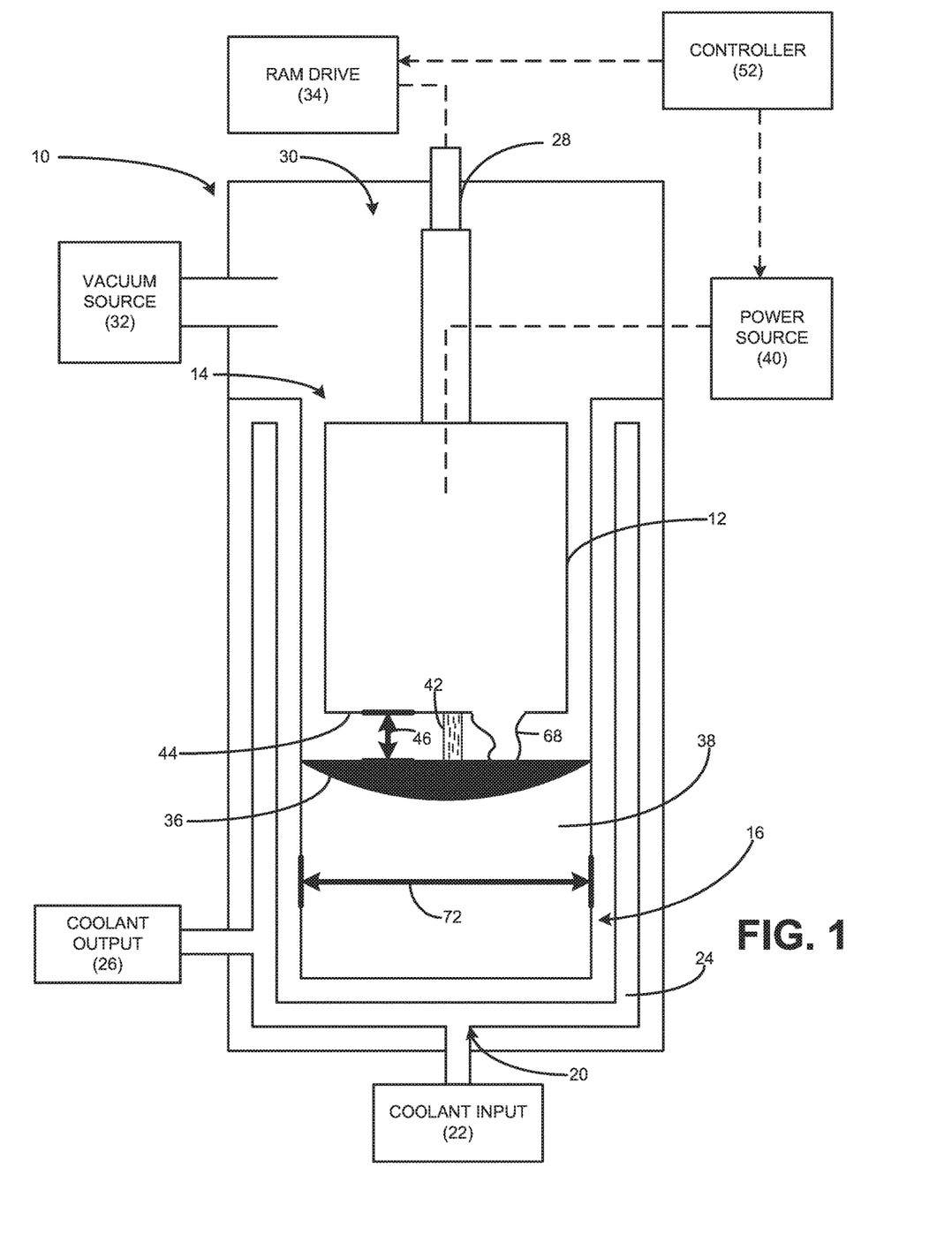
FIG. 1 is a schematic depiction of a vacuum arc remelting (VAR) furnace and elements of an associated control system, in accordance with an embodiment of the disclosure.

Turning now to the drawings and with specific reference to FIG. 1, an example vacuum arc remelting (VAR) furnace 10 is illustrated schematically. The VAR furnace 10 may be configured to remelt a metal by melting an electrode 12, comprised of the metal, within a melting chamber 14 of the VAR furnace 10. Within the melting chamber 14, the electrode 12 may be positioned within a crucible 16. In some examples, the crucible 16 may be formed from copper, as copper may provide desired thermal characteristics and/or electrical conductivity; however, the crucible 16 is certainly not limited to being formed form copper and may be formed of any material which provides the desired thermal characteristics and/or electrical conductivity for a VAR process.

In some examples, the crucible 16 may be cooled by, for example, the cooling system 20. The cooling system 20 may, for example, include a coolant source 22, which inputs a coolant fluid into the crucible 16 via one or more coolant channels 24. The coolant may exit the crucible 16 via a coolant output 26, wherein it may either be discarded or be chilled, such that it may re-enter the crucible 16 as a coolant via the coolant source 22. The coolant may be, for example, water or any water-based coolant; however, the coolant is certainly not limited to being water or water-based and may be any proper coolant configured to cool the crucible 16 before, during, and/or after use in a VAR process.

To position the electrode 12 within the VAR furnace 10 and relative to the crucible 16, the VAR furnace 10 may further include a ram 28, which is operatively associated with the electrode 12. The ram 28 and electrode 12 may move within a vacuum chamber 30 of the VAR furnace 10. The vacuum chamber 30 may be evacuated of impurities and/or environmental conditions to create a vacuum seal within the vacuum chamber 30 and melting chamber 14. To evacuate the vacuum chamber 30, a vacuum source 32 may be included. For moving the ram 28 and, by association, the electrode 12, a ram drive 34 may be included for positioning the electrode 12 relative to the crucible 16. The ram drive 34 may be any suitable driving mechanism known in the art that may be employed for positioning the electrode 12 via the ram 28. For example, the ram drive 34 may include, but is certainly not limited to including, a servo motor, a gear reduction drive, any known motor, a solenoid valve piston drive, a hydraulic drive, or any combinations thereof.

The ram drive 34 may be utilized to position the electrode 12 relative to a melt pool 36 of an ingot 38, the ingot 38 being a remelt of the metal of the electrode 12 within the crucible 16. During operation of the VAR furnace 10, a power source 40 may pass a, relatively, low voltage and high amperage electrical current through the ram 28 and the electrode 12. In some examples, such a current may have a relatively low voltage of, approximately, 20-30 volts while having a relatively high amperage current of, for example, 1 or greater kiloamperes. As the current passes to the electrode 12, an electric arc 42 is produced between a tip 44 of the electrode 12 and the melt pool 36 of the ingot 38. The electric arc 42 is depicted in the magnified view of FIG. 2. By applying the current to the electrode 12 to create the electric arc 42, a slow melting of the electrode 12, into the melt pool 36, may be caused.

Such slow melting may be contained within the vacuum sealed environment of the vacuum chamber 30 and/or the melting chamber 14. The current applied to the electrode 12 may be of a negative voltage, while the ingot 38 and, thusly, its melt pool 36 may be held at a ground potential. In some examples, a temperature of the ingot 38 may be controlled by the cooling system 20 and, therefore, by cooling the ingot 38, the limited melt pool 36 may be maintained while the cooled portion of the ingot 38 remains solid.

As the applied current causes metal to melt off of the electrode 12, the melted off metal is then deposited on the ingot 38. Accordingly, due to the melting, materials melted off of the electrode 12 are proportional to the materials added to the ingot 38. However, because the electrode 12 typically has a lesser diameter than that of the crucible 16 and, in turn, the ingot 38, the ram 28 may drive the electrode 12 towards the ingot 38 at a rate exceeding the growth rate of the ingot 38.

Figure 2:
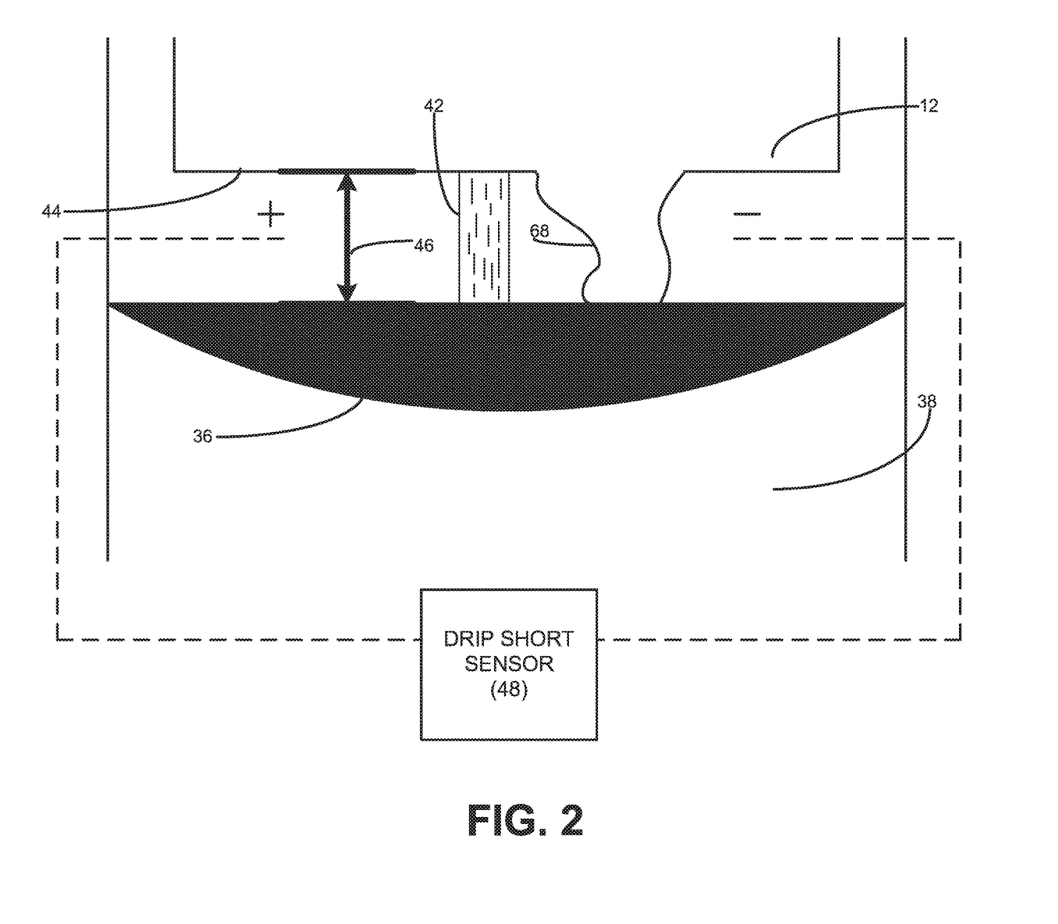
FIG. 2 is a magnified view of an arc gap, between an electrode and an ingot of the VAR furnace of FIG. 1, showing an electric arc disposed within the arc gap, in accordance with FIG. 1 and the present disclosure.

The ram drive 34 is configured to drive the ram 28 towards the ingot 38 as the remelt occurs. During remelt, an arc gap 46 is formed, which may be defined as a gap between the tip 44 of the electrode 12 and the melt pool 36 of the ingot 38. The arc gap 46 should be maintained relatively consistently throughout VAR processes for optimum performance.

However, it may be impractical or impossible to physically view the arc gap 46 during a VAR process using the VAR furnace 10 and, therefore, the arc gap 46 may be determined or derived based on other data that is more accessible. For example, such as in the depiction of the arc gap 46, determination of the arc gap 46 may be based on a correlation of drip shorts and/or a drip short frequency, caused by the electric arc 42, and arc length. The drip short frequency caused by the electric arc 42 may be determined by using drip short sensor 48, which may be any sensor capable of determining the drip short frequency caused by the electric arc 42, known in the art. The drip short sensor 48 may include one or more sensors capable of determining voltage across the electric arc 42, current across the electric arc 42, resistance across the electric arc 42, and/or any other data associated with the electric arc 42 and/or the arc gap 46, which may be useful in determining a drip short frequency, over a period of time, caused by the electric arc 42. In some examples, the drip short sensor 48 may determine the drip shorts based on voltage measurements of the electric arc 42. Additionally or alternatively, such voltage measurements may be provided to a controller 52 by the drip short sensor 48, wherein the controller 52 then determines the drip short frequency of the electric arc 42. The drip short sensor 48 may be used as part of or in conjunction with a control system 50, including the controller 52, configured for controlling a VAR process of the VAR furnace 10, which is depicted schematically in FIG. 3 and described in more detail below.

Figure 3:
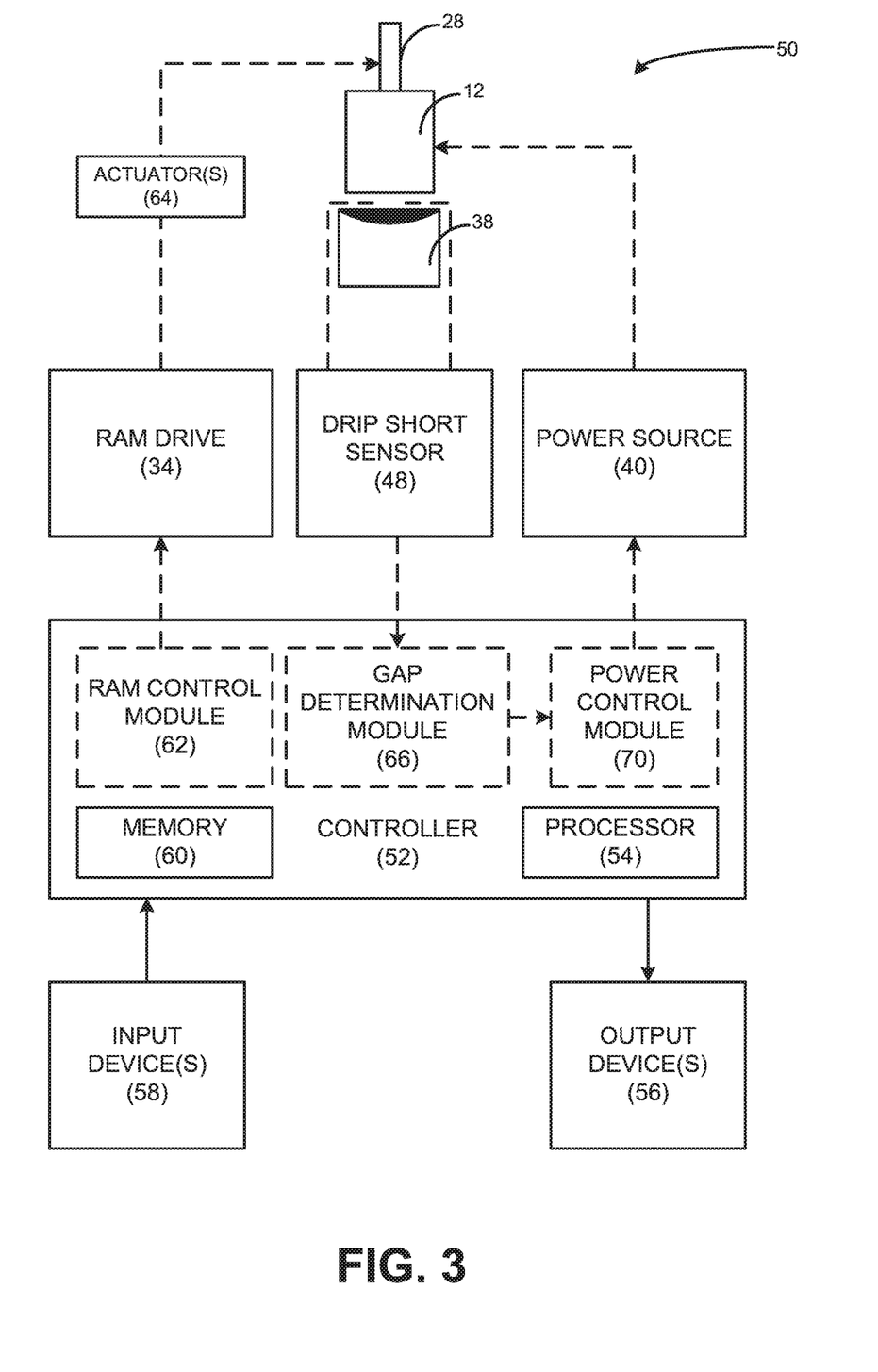
FIG. 3 is a schematic block diagram of a system for controlling a VAR process utilizing the VAR furnace of FIG. 1, in accordance with FIGS. 1 and 2 and an embodiment of the present disclosure.

The system 50 may include the controller 52, which includes, at least, a processor 54. The controller 52 may be any electronic controller or computing system including a processor which operates to perform operations, execute control algorithms, store data, retrieve data, gather data, and/or any other computing or controlling task desired. The controller 52 may be a single controller or may include more than one controller disposed to interact with one or more of the ram drive 34, the power source 40, the drip short sensor 48, and, optionally, output device(s) 56 and/or input device(s) 58. The input device(s) 58 can be implemented by, for example, a keyboard, a mouse, a touchscreen, a trackpad, a trackball, and/or a voice recognition system. For example, the input device(s) 58 may include any wired or wireless device for connecting inputting data in to the controller 52. The output device(s) 28 may include one or more of an audio output device, a visual output device, a tactile output device, or any combinations thereof.

Functionality of the controller 52 may be implemented in hardware and/or software and may rely on one or more data maps. To that end, the controller 52 may include or be associated with a memory 60, which may be one or both of internal memory and external memory, such as a database or server. The memory 60 may include, but is not limited to including, one or more of read only memory (ROM), random access memory (RAM), a portable memory, and the like. Such memory media are examples of nontransitory memory media.

For controlling a ram velocity of the ram 28 during a VAR process of the VAR furnace 10, the controller 52 may execute a ram control module 62. The ram control module 62 may be machine readable instructions executed by the processor 54 and, for example, stored on the memory 60. The ram control module 62 may determine a ram velocity necessary for the current VAR process. In some examples, the ram velocity may be based on a desired melt rate for the electrode 12, during the VAR process. For example, the ram velocity may be dynamically altered, by the ram control module 62, to change the melt rate of the electrode 12 to achieve the desired melt rate.

Based on the determined ram velocity, the ram control module 62 may control the ram velocity of the ram 28 by providing ram velocity instructions to the ram drive 34. In some examples, the ram drive 34 may drive actuators 64 that will position and/or move the ram 28 based on the ram velocity instructions.

To determine and/or estimate the current arc gap 46 during the VAR process of the VAR furnace 10, the controller 52 may execute a gap determination module 66. The gap determination module 66 may receive input from the drip short sensor 48. Utilizing known correlations between drip short frequency and arc gap length, the gap determination module 66 may determine a real time length of the arc gap 46. In some examples, the gap determination module 66 may determine the real time arc gap length based on a correlation of arc gap length and drip short frequency, which, in some examples, can be determined from voltage measurements of the arc 42.

When the metal of the electrode 12 is transferred from the electrode 12 to the ingot 38, formation and rupture of molten metal columns are formed within the arc gap 46, such as the column 68 depicted in FIG. 2. Such columns form a low resistance bridge between the electrode 12 and the ingot 38, which causes the drip short. A drip short may cause the electric arc 42 to be momentarily extinguished, which will result in a drop in the arc voltage, which is monitored by the drip short sensor 48. Such drops in voltage may be monitored over a period of time to determine the drip short frequency for the VAR process. As is known in the art, drip short frequency and arc gap length are closely correlated; therefore, based on such correlation(s), the gap determination module 66 may determine the real time length for the arc gap 46.

The real time arc gap length may be utilized by a power control module 70 to control and/or alter the power level input to the electrode 12. The power control module 70 may operate at a base power level, which may be based on a predetermined power level for a given VAR process and may be stored in the memory 60 or input from the input device(s) 58. The power control module 70 may alter the power input to the electrode 12, with respect to the base power level, if the real time arc gap length, received from the gap determination module 66, indicates that the real time arc gap length differs from the desired arc gap length for the current VAR process. If the real time arc gap length does differ from a desired arc gap length, then the power control module may provide instructions to the power source 40 to raise or lower the power level and, thusly, lower or raise the arc gap length of the arc gap 46. For example, if the real time arc gap is determined to be too small, in relation to the desired arc gap length, the power control module 70 may raise the power input to the electrode 12 by the power source 40, which will melt off a greater amount of metal from the electrode 12, with respect to time, and, by virtue of melting more metal quicker, will raise the arc gap length to meet the desired arc gap length. Alternatively, if the current arc gap is determined to be too large, in relation to the desired arc gap length, then the power control module 70 may lower the power level input to the electrode 12 by the power source 40, which will melt off less metal from the electrode 12, with respect to time, and, by virtue of melting less metal over a period of time, will decrease the arc gap length to meet the desired arc gap length.

To properly form the ingot 38 with optimal metallurgical properties, the control system 50 may be utilized in conjunction with the VAR furnace 10. The system 50 may be utilized in addition to or in conjunction with a method 100 for controlling a VAR process utilizing the VAR furnace 10. The method 100 is exemplified by the flowchart of FIG. 4. While the description of the method 100 presented below references elements of the system 50 and the VAR furnace 10, the method 100 may be executed using alternative elements and should not be construed as limited to execution via the system 50 and/or components thereof.

Figure 4:
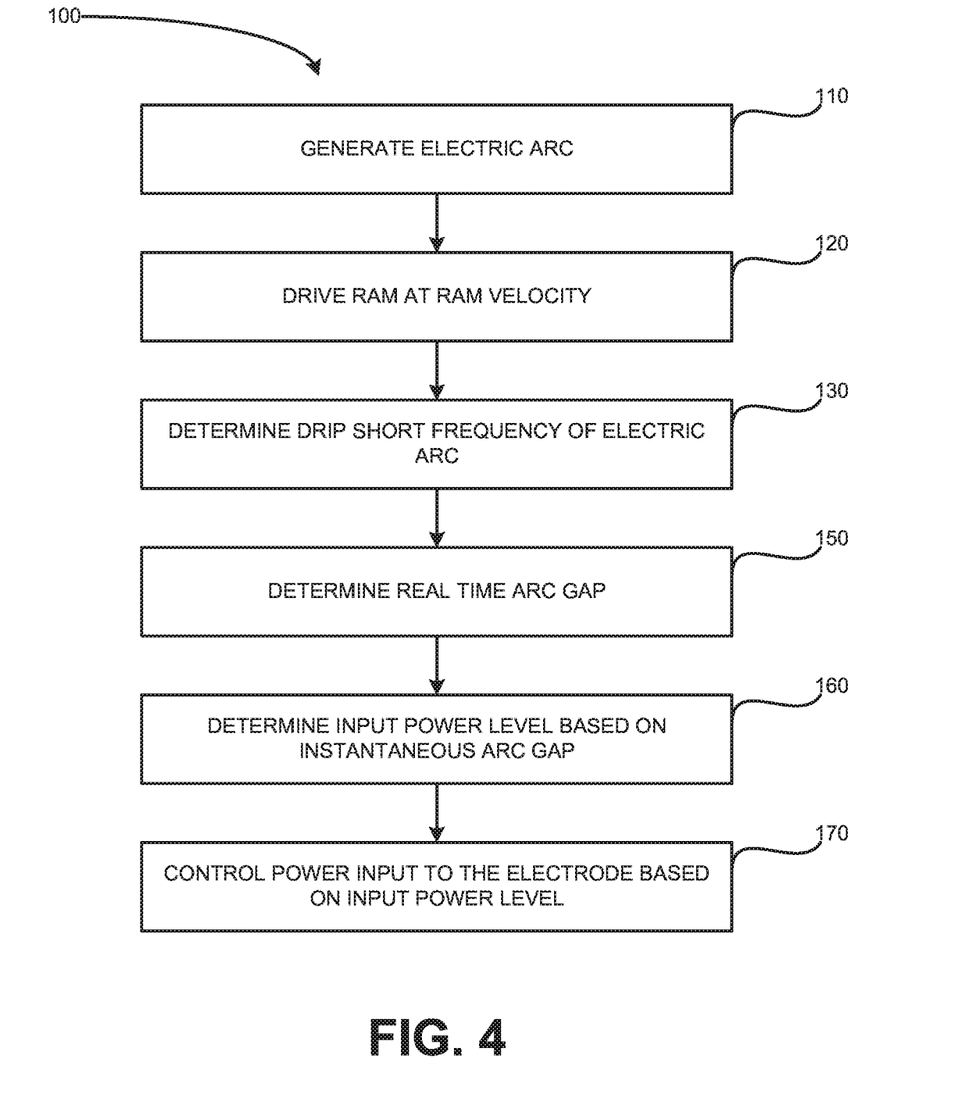
FIG. 4 is an example flowchart illustrating a method for controlling a VAR process utilizing a VAR furnace, in accordance with an embodiment of the present disclosure.

The method 100 may begin by generating the electric arc 42 between the electrode tip 44 and the melt pool 36, using the power source 40, as depicted in block 110. By, for example, utilizing the ram drive 34, the ram may be driven at a ram velocity, as depicted in block 120. The ram velocity may be configured to achieve a desired melt rate for the electrode 12, as discussed above. The method 100 may further include determining a drip short frequency of the electric arc 42, over a period of time, using the drip short sensor 48, as depicted in block 130.

Based on, at least, the drip short frequency, the method 100 may determine a real time arc gap length between the electrode tip 44 and the melt pool 36, based on a correlation between the drip short frequency and arc gap length, as depicted in block 150.

The method 100 may include determining an input power level to the electrode 12 based on the real time arc gap length, the input power level being configured to generate a desired arc gap length between the electrode tip 44 and the melt pool 36 upon transmission of power, by the power source 40, at the input power level, as depicted in block 160. In some examples, determining an input power level to the electrode 12 based on the real time arc gap length may include determining a decrease in power of the power source 40, if the real time arc gap length is greater than the desired arc gap length. Additionally or alternatively, determining an input power level to the electrode 12 based on the real time arc gap length may include determining an increase in power of the power source 40 if the real time arc gap length is less than the desired arc gap length. Based on the input power level, the method 100 may control power input to the electrode 12, using the power source 40, as depicted in block 170.

INDUSTRIAL APPLICABILITY

In general, the foregoing disclosure finds utility in various industries, including, but not limited to, metallurgical purification and, particularly, ingot production utilizing remelting processes. By utilizing the systems and methods disclosed herein, greater purity and/or structural integrity of a metal may be achieved during a VAR process. Further, by utilizing the power-based arc gap control systems and methods, disclosed herein proper control of arc gap may be achieved when using VAR furnaces having crucibles with large inner diameters, for producing ingots of larger diameters.

For example, as shown in FIG. 1, the crucible 16 may have an inner diameter 72 which correlates to the diameter of the ingot 38 produced in the crucible. In some examples, the inner diameter 72 may be greater than 750 millimeters. In some such examples, the inner diameter 72 may be in the range of 1000-1100 millimeters. When VAR processes are performed to create ingots having such larger diameters, controlling ram speed to correct and/or maintain the arc gap 46 may be impractical or difficult. Therefore, prior control systems which corrected arc gap by altering ram velocity may not be adequate in controlling arc gap during a VAR process, wherein the produced ingots are of such greater size. Accordingly, the systems and methods disclosed herein provide greater control of the arc gap and, in turn, the VAR process itself, by controlling the arc gap based on the power input by the power source 40, rather than, or in addition to, altering the ram speed.

It will be appreciated that the present disclosure provides vacuum arc remelting control systems, VAR control methods VAR furnaces, and, more particularly, VAR control systems and methods configured to control an arc gap based on power input. While only certain embodiments have been set forth, alternatives and modifications will be apparent from the above description to those skilled in the art. These and other alternatives are considered equivalents and within the spirit and scope of this disclosure and the appended claims.

What is claimed is:

1. A control system for a vacuum arc remelting (VAR) process for a metal, the VAR process utilizing a VAR furnace, the VAR furnace including a crucible in which an ingot formed of the metal is formed, a ram operatively associated with an electrode formed of the metal, a vacuum chamber, and a vacuum source associated with the vacuum chamber, the system comprising:
 a direct current (DC) power source operatively associated with the electrode and configured to produce an electric arc between an electrode tip of the electrode and a melt pool of the ingot;
 a ram drive operatively associated with the ram and configured to drive the ram;
 a drip short sensor configured to measure a drip short frequency of the electric arc over a period of time; and
 a controller, including a processor, operatively associated with the DC power source, the ram drive, and the drip short sensor, wherein the controller comprises:
  a gap determination module configured to determine a real time arc gap length between the electrode tip and the melt pool based on the drip short frequency received from the drip short sensor; and a power control module configured to instruct the DC power source to alter an input power level supplied to the electrode if the real time arc gap length determined by the gap determination module differs from a desired arc gap length.

2. The control system of claim 1, wherein the power control module is configured to instruct the power source to lower the power level if the real time arc gap length is greater than the desired arc gap length.

3. The control system of claim 1, wherein the power control module is configured to instruct the power source to raise the power level if the real time arc gap length is less than the desired arc gap length.

4. The control system of claim 1, wherein an inner a diameter of the ingot formed within the crucible is greater than or equal to 750 millimeters.

5. The control system of claim 1, wherein a diameter of the ingot formed within the crucible is within a range of 1000-1100 millimeters.

6. The vacuum arc remelting (VAR) furnace for performing the VAR process for the metal according to claim 1, the VAR furnace comprising:
the crucible in which the ingot formed of the metal is formed;
the ram operatively associated with the electrode formed of the metal;
the vacuum chamber;
the vacuum source associated with the vacuum chamber;
the direct current (DC) power source operatively associated with the electrode and configured to produce the electric arc between the electrode tip of the electrode and the melt pool of the ingot;
the ram drive operatively associated with the ram and configured to drive the ram;
the drip short sensor configured to measure the drip short frequency of the electric arc over a period of time; and
the controller, including the processor, operatively associated with the DC power source, the ram drive, and the drip short sensor, the controller further including the gap determination module and the power control module.

7. The VAR furnace of claim 6, further comprising a cooling system configured to cool the ingot within the crucible during the VAR process.

8. The VAR furnace of claim 6, wherein a diameter of the ingot formed within the crucible is greater than or equal to 750 millimeters.

9. The VAR furnace of claim 6, wherein a diameter of the ingot formed within the crucible is within a range of 1000-1100 millimeters.

10. The VAR furnace of claim 6, wherein the power control module is configured to instruct the power source to lower the power level if the real time arc gap length is greater than the desired arc gap length.

11. The VAR furnace of claim 6, wherein the power control module is configured to instruct the power source to raise the power level if the real time arc gap length is less than the desired arc gap length.

12. A method for controlling a vacuum arc remelting (VAR) process, the VAR process utilizing a VAR furnace, the VAR furnace including a crucible in which an ingot formed of the metal is formed, a ram operatively associated with an electrode formed of the metal, a vacuum chamber, and a vacuum source associated with the vacuum chamber, the method comprising:
generating an electric arc between an electrode tip of the electrode and a melt pool of the ingot using a direct current (DC) power source operatively associated with the electrode;
driving the ram at a ram velocity using a ram drive operatively associated with the ram, the ram velocity configured to achieve a desired melt rate for the electrode;
determining a drip short frequency of the electric arc over a period of time using a drip short sensor;
determining a real time arc gap length between the electrode tip and the melt pool, using the drip short frequency over the period of time, based on a correlation between the drip short frequency and arc gap length; and
altering a power level supplied to the electrode by the DC power source if the real time arc gap length deviates from a desired arc gap length.

13. The method of claim 12, wherein altering the power level supplied to the electrode by the DC power source comprises decreasing the power level if the real time arc gap length is greater than the desired arc gap length.

14. The method of claim 12, wherein altering the power level supplied to the electrode by the DC power source comprises increasing the power level if the real time arc gap length is less than the desired arc gap length.

* * * * *